United States Patent
Cai et al.

(10) Patent No.: US 8,812,581 B2
(45) Date of Patent: Aug. 19, 2014

(54) HOME ZONE DETERMINATION FOR ELECTRONIC MESSAGING SERVICES

(75) Inventors: Yigang Cai, Naperville, IL (US); Alok Sharma, Lisle, IL (US)

(73) Assignee: Alcatel Lucant, Boulogne-Billancourt (FR)

( * ) Notice: Subject to any disclaimer, the term of this patent is extended or adjusted under 35 U.S.C. 154(b) by 1574 days.

(21) Appl. No.: 11/456,480

(22) Filed: Jul. 10, 2006

(65) Prior Publication Data

US 2008/0010349 A1 Jan. 10, 2008

(51) Int. Cl.
*G06F 15/16* (2006.01)
*H04L 12/14* (2006.01)
*H04W 4/24* (2009.01)
*H04W 4/14* (2009.01)
*H04W 4/02* (2009.01)

(52) U.S. Cl.
CPC ............ *H04L 12/14* (2013.01); *H04L 12/1485* (2013.01); *H04W 4/24* (2013.01); *H04W 4/14* (2013.01); *H04W 4/02* (2013.01)
USPC ........................................................ 709/203

(58) Field of Classification Search
CPC ..... H04L 12/14; H04L 12/1485; H04L 12/00; H04L 12/02; H04W 4/00; H04W 4/12; H04W 4/24; H04W 4/14; H04W 4/02
USPC .......................................................... 709/203
See application file for complete search history.

(56) References Cited

U.S. PATENT DOCUMENTS

| | | | | |
|---|---|---|---|---|
| 5,594,947 A * | 1/1997 | Grube et al. | ................... | 455/509 |
| 5,768,509 A * | 6/1998 | Gunluk | ......................... | 709/203 |
| 6,332,075 B1 * | 12/2001 | Verdonk | ....................... | 455/408 |
| 6,393,288 B1 * | 5/2002 | Sollee et al. | ................... | 455/445 |
| 6,965,297 B1 * | 11/2005 | Sandahl | ........................ | 340/7.25 |
| 7,197,306 B1 * | 3/2007 | Song | ............................... | 455/436 |
| 2001/0020892 A1 * | 9/2001 | Helferich | ....................... | 340/7.3 |
| 2004/0224682 A1 * | 11/2004 | Kang | ............................ | 455/433 |
| 2005/0043012 A1 * | 2/2005 | Benco et al. | ................... | 455/406 |
| 2005/0232236 A1 * | 10/2005 | Allison et al. | ................. | 370/352 |
| 2006/0040641 A1 * | 2/2006 | Dawson et al. | ................ | 455/405 |
| 2006/0262752 A1 * | 11/2006 | Moore et al. | ................... | 370/331 |

FOREIGN PATENT DOCUMENTS

| WO | 9805182 | | 2/1998 |
|---|---|---|---|
| WO | WO98/05182 | * | 2/1998 |

* cited by examiner

*Primary Examiner* — William Goodchild
(74) *Attorney, Agent, or Firm* — Duft Bornsen & Fettig, LLP (57) ABSTRACT

Systems and methods are disclosed that determine whether a sender/recipient using an electronic messaging service (e.g., SMS messaging service or MMS messaging service) is located in a defined home zone. A communication network in one embodiment includes a messaging system, such as an SMSC or an MMSC, and a home zone system. If the messaging system receives an electronic message from a sender to a recipient, then the home zone system determines a location of the sender/recipient. The home zone system also determines whether the sender/recipient is located in a home zone. If the home zone system determines that the sender/recipient is located in a home zone, then the messaging system forwards the electronic message to the recipient. If the home zone system determines that the sender/recipient is not located in the home zone, then the messaging system blocks the electronic message.

17 Claims, 8 Drawing Sheets

HOME ZONE DETERMINATION FOR ELECTRONIC MESSAGING SERVICES

BACKGROUND OF THE INVENTION

1. Field of the Invention

The invention is related to the field of communication networks and, in particular, to providing systems and methods that determine whether a sender and/or a recipient of an electronic message (e.g., SMS message or MMS message) is located in a home zone defined for the sender and/or the recipient.

2. Statement of the Problem

Some service providers rate prepaid and postpaid calls based on the locations of a called party. The ratings are typically based on home zones defined by the service providers. The service providers map out particular geographic areas into calling areas, and define which of the calling areas comprise home zones for particular parties. A home zone comprises an area of a network where charging for calls is treated differently than charging outside of the home zone. If a called party is located in a home zone, then calls to the called party comprise local calls and are billed accordingly. If the called party is not located in a home zone, then calls to the called party comprise roaming calls and are billed accordingly.

In addition to voice services, many service providers offer text messaging services, such as Short Message Service (SMS). SMS is a service available to digital mobile phones that allows for transmitting and receiving short text messages. Many service providers also offer multimedia messaging services, such as Multimedia Message Service (MMS), that allow for transmitting and receiving not only text but also various kinds of multimedia content, such as images, audio clips, video clips, etc.

To send an SMS message, a sender first enters the text into a mobile phone or other text-enabled device. The sender then enters one or more phone numbers for the recipients of the SMS message, and sends the SMS message. A Short Message Service Center (SMSC) receives and stores the SMS message. The SMSC then attempts to forward the SMS message to the recipient when the recipient is available.

One problem with many SMS messaging services and MMS messaging services is that charging for the messaging services is flat rate. A subscriber to the messaging service typically pays a flat monthly rate, and can then send or receive messages regardless of whether they in a home zone. Service providers may want more control over the charging for these and other messaging services.

SUMMARY OF THE SOLUTION

The invention solves the above and other problems by providing systems and methods that determine whether a sender and/or a recipient of an electronic message (e.g., SMS message or MMS message) is located in their defined home zone or home zones. In one example, if the sender is located in a home zone, then the sender is allowed to send electronic messages. If not, then the electronic messages are blocked until the sender moves into a home zone or until additional payment is agreed to for delivering the electronic messages. In another example, if the recipient is located in a home zone, then the recipient is allowed to receive electronic messages. If not, then the electronic messages are blocked until the recipient moves into a home zone or until additional payment is agreed to for delivering the electronic messages. The systems and methods described herein advantageously allow a service provider to no charge or flat rate charge for a messaging service when the sender and/or recipient is located in a home zone, and to charge a higher rate or a per-message rate when the sender and/or recipient are outside of a home zone. This advantageously gives a service provider more control over charging for messaging services, such as text messaging services and multimedia messaging services.

In one embodiment of the invention, a communication network includes a messaging system, such as an SMSC or a Multi-Media Service Center (MMSC), and a home zone system. The messaging system is adapted to receive an electronic message from a sender to a recipient. The home zone system is adapted to determine a location of the recipient responsive to the messaging system receiving the electronic message. The home zone system is also adapted to determine whether the recipient is located in a home zone defined for the recipient. If the home zone system determines that the recipient is located in a home zone, then the messaging system is further adapted to deliver the electronic message to the recipient. If the home zone system determines that the recipient is not located in a home zone, then the messaging system is further adapted to block the electronic message.

In another embodiment, the home zone system is adapted to determine a location of the sender of the electronic message, and to determine whether the location of the sender is located in a home zone defined for the sender. If the home zone system determines that the sender is located in a home zone, then the messaging system is further adapted to deliver the electronic message to the recipient. If the home zone system determines that the sender is not located in a home zone, then the messaging system is further adapted to block the electronic message.

If the electronic message is blocked by the messaging system in either of the above embodiments, then the communication network may initiate one or more retries. For instance, the messaging system is adapted to buffer the electronic message. After a retry time interval, the home zone system is adapted to determine a location of the sender/recipient, and determine whether the sender/recipient has moved into a home zone. If the sender/recipient has moved into a home zone, then the messaging system is adapted to deliver the electronic message to the recipient. If the sender/recipient has not moved into a home zone, then the messaging system is adapted to continue to block the electronic message.

Alternatively, if the electronic message is blocked by the messaging system, then the communication network may request additional payment to deliver the electronic message. For instance, the messaging system is adapted to transmit a notification message to the sender/recipient of the electronic message indicating that additional payment is needed to deliver the electronic message. If the messaging system receives a response message indicating an agreement to the additional payment, then the messaging system is adapted to deliver the electronic message to the recipient.

The invention may include other exemplary embodiments described below.

DESCRIPTION OF THE DRAWINGS

The same reference number represents the same element on all drawings.

DETAILED DESCRIPTION OF THE INVENTION

FIGS. 1-8 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
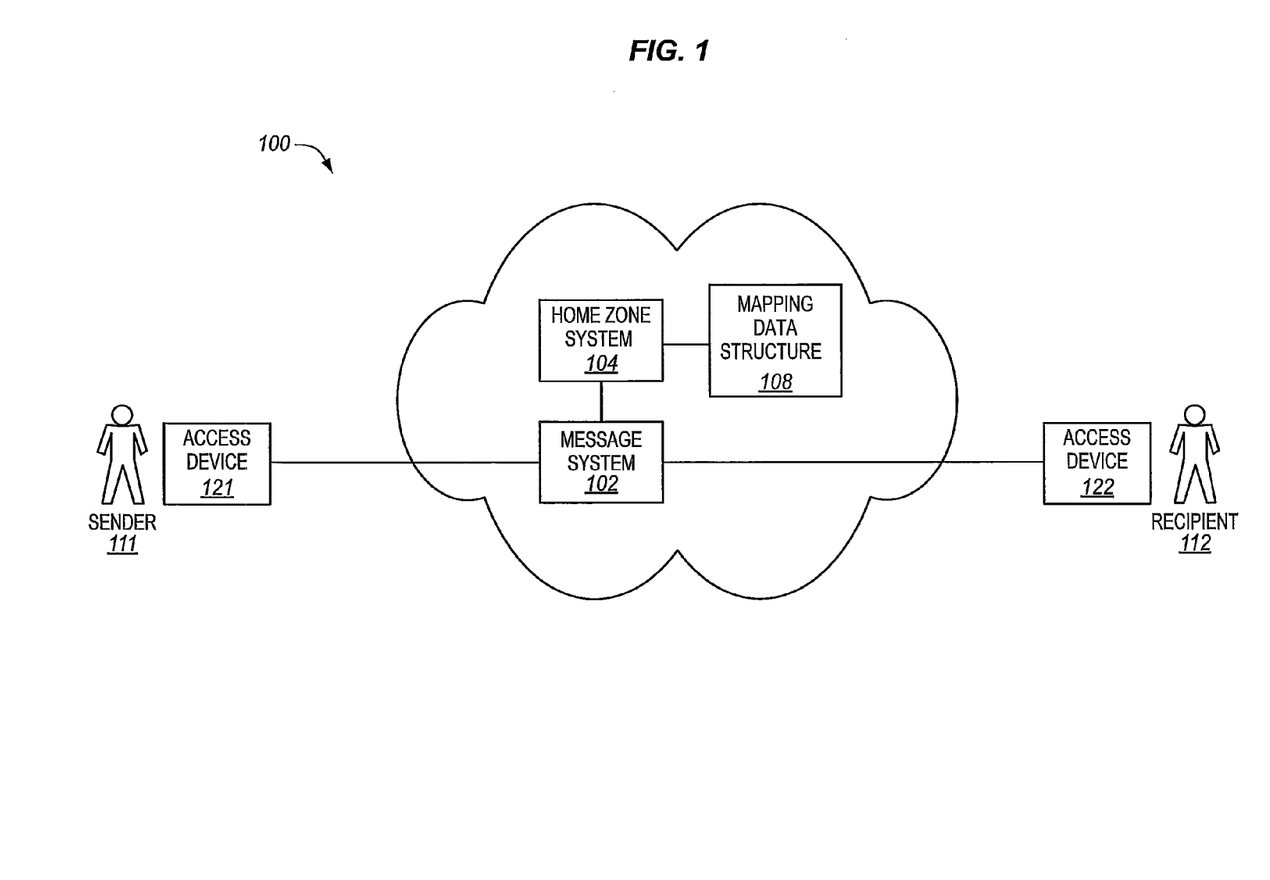
FIG. 1 illustrates a communication network in an exemplary embodiment of the invention.

FIG. 1 illustrates a communication network 100 in an exemplary embodiment of the invention. Communication network 100 may represent a wireline network, an IP Multimedia Subsystem (IMS) network, a packet-based network (IP network), a wireless network, or another type of network. Communication network 100 is adapted to provide an electronic messaging service, such as an SMS messaging service or an MMS messaging service. Communication network 100 is illustrated as including a messaging system 102, a home zone system 104, a sender 111 operating an access device 121, and a recipient 112 operating an access device 122. Access devices 121-122 each comprise an appropriately-enabled device to send and receive electronic messages through messaging system 102. Access devices 121-122 may comprise a wireline phone, a wireless (mobile) phone, a PDA, a PC, a VoIP phone, a SIP phone, or any other type of access device. There may be intermediate systems, servers, networks, etc, between access devices 121-122 and messaging system 102 that are not shown for the sake of brevity.

Messaging system 102 comprises any device, server, or other system adapted to exchange electronic messages between access devices 121-122. An electronic message comprises any type of message exchanged through electronically-mediated communication. An electronic message may comprise a text message (e.g., an SMS message), a multimedia message (e.g., an MMS message), or another type of message. Messaging system 102 may take on different forms depending on the type of electronic message being transmitted. For instance, if the electronic message comprises an SMS message, then messaging system 102 comprises an SMSC that is adapted to receive SMS messages, determine the current status of the recipient 112, and then deliver the SMS message to the recipient 112 or store the SMS message for later transmission. If the electronic message comprises an MMS message, then messaging system 102 comprises an MMSC that is adapted to receive MMS messages, determine the current status of the recipient 112, and then deliver the MMS message to the recipient 112 or store the MMS message for later transmission.

Home zone system 104 comprises any system or server adapted to determine whether a subscriber to an electronic messaging service is located in a home zone. The service provider operating communication network 100 maps out particular geographic areas into calling areas, and defines which of the calling areas comprise home zones for particular subscribers. A home zone comprises an area of communication network where charging for calls is treated differently than charging outside of the home zone. A subscriber may belong to one or more home zones.

Figure 2:
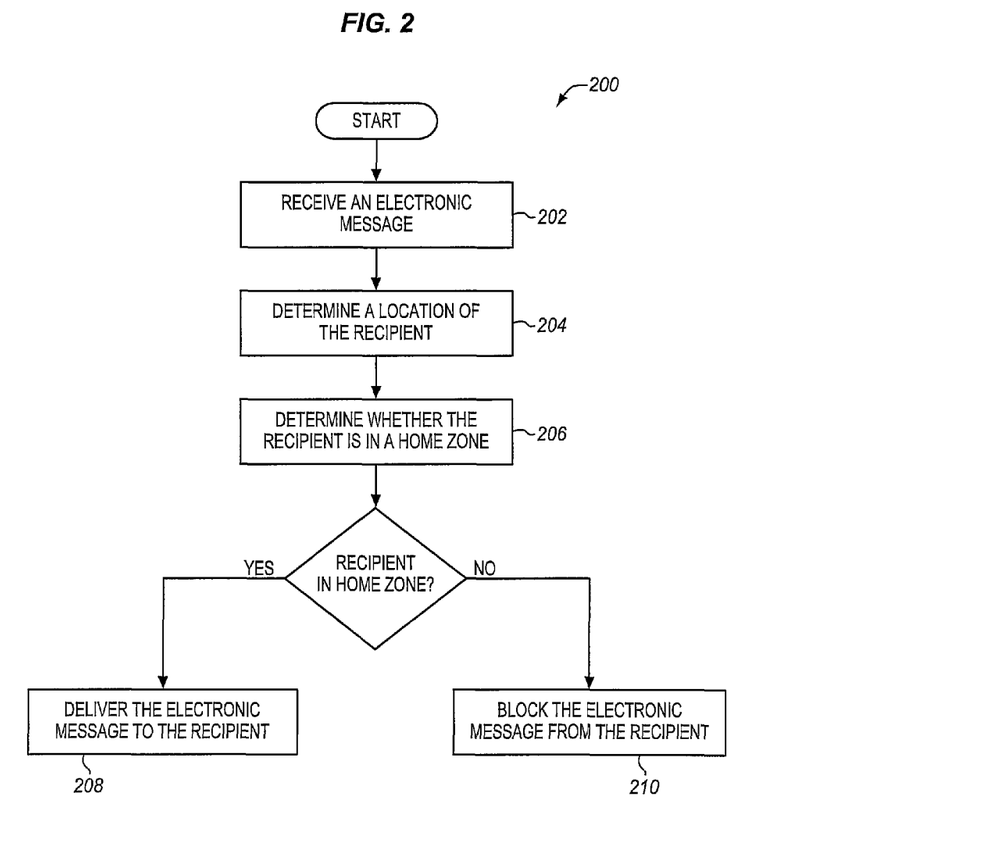
FIG. 2 is a flow chart illustrating a method of providing the electronic messaging service in a communication network in an exemplary embodiment of the invention.

Assume for example that sender 111 uses access device 121 to transmit an electronic message to recipient 112 using access device 122. FIG. 2 is a flow chart illustrating a method 200 of providing the electronic messaging service in communication network 100 in an exemplary embodiment of the invention. The steps of method 200 will be described with reference to communication network 100 in FIG. 1, but method 200 is not limited to the structure shown in FIG. 1. The steps of the flow chart in FIG. 2 are not all inclusive and may include other steps not shown.

In step 202, messaging system 102 receives the electronic message from access device 121 of sender 111. Messaging system 102 may forward the electronic message to home zone system 104, or may forward some information for the electronic message to home zone system 104, such as a directory number for sender 111, a directory number for recipient 112, etc. In step 204, home zone system 104 determines a location of recipient 112. Home zone system 104 may determine the location of recipient 112 in a variety of ways. For instance, home zone system 104 may query one or more servers (not shown in FIG. 1) in communication network 100 that monitors the location of recipient 112 (and his/her associated access device 122). One example of a server that home zone system 104 may query is a subscriber database for recipient 112, such as a Home Location Register (HLR), a Home Subscriber Server (HSS), etc.

In step 206, home zone system 104 determines whether recipient 112 is located in a home zone defined for recipient 112 based on the determined location of recipient 112. Home zone system 104 may determine whether recipient 112 is located in a home zone in a variety of ways. For instance, communication network 100 may include a mapping data structure 108 that includes a plurality of entries that map physical locations to calling areas. As an example, an entry in mapping data structure 108 may map street address X to calling area Y. In another example, an entry in mapping data structure 108 may map latitude A and longitude B to calling area Y. Home zone system 104 may query mapping data structure 108 based on the location of recipient 112 to determine the calling area associated with the recipient's location. Home zone system 104 may then compare the calling area returned from mapping data structure 108 to a subscriber profile for recipient 112. The subscriber profile indicates one or more calling areas that define a home zone or home zones for recipient 112. If the calling area returned from mapping data structure 108 is included in the subscriber profile for recipient 112, then recipient 112 is located in their defined home zone.

In step 208, messaging system 102 delivers the electronic message to recipient 112 through access device 122 responsive to home zone system 104 determining that recipient 112 is located in a home zone. In step 210, messaging system 102 blocks the electronic message responsive to home zone system 104 determining that recipient 112 is not located in a home zone.

In FIG. 2, communicate network 100 determines whether recipient 112 is located in a home zone. Communication network 100 may additionally or alternatively determine whether sender 111 is located in a home zone before allowing message delivery, which is illustrated in FIG. 3.

Figure 3:
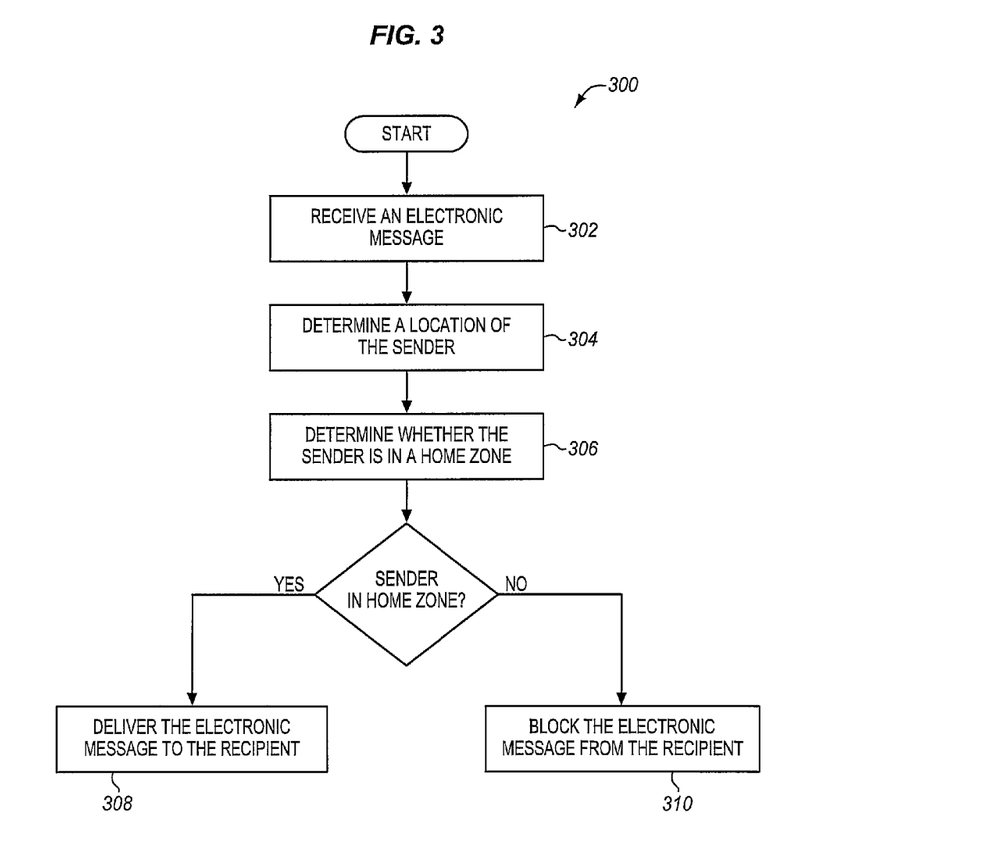
FIG. 3 is a flow chart illustrating another method of providing the electronic messaging service in a communication network in an exemplary embodiment of the invention.

FIG. 3 is a flow chart illustrating another method 300 of providing the electronic messaging service in communication network 100 in an exemplary embodiment of the invention. The steps of method 300 will be described with reference to communication network 100 in FIG. 1, but method 300 is not limited to the structure shown in FIG. 1. The steps of the flow chart in FIG. 3 are not all inclusive and may include other steps not shown.

In step 302, messaging system 102 receives the electronic message from access device 121 of sender 111. In step 304, home zone system 104 determines a location of sender 111. In step 306, home zone system 104 determines whether sender 111 is located in a home zone defined for sender 111. In step 308, messaging system 102 delivers the electronic message to recipient 112 through access device 122 responsive to home zone system 104 determining that sender 111 is located in a home zone. In step 310, messaging system 102 blocks the electronic message responsive to home zone system 104 determining that sender 111 is not located in a home zone.

If messaging system 102 blocks the electronic message in either of the embodiments described above, then communication network 100 may retry delivery of the electronic message to recipient 112 one or more times. The assumption is that sender 111 or recipient 112 may move into their home zone at which time messaging system 102 can deliver the electronic message to recipient 112.

Figure 4:
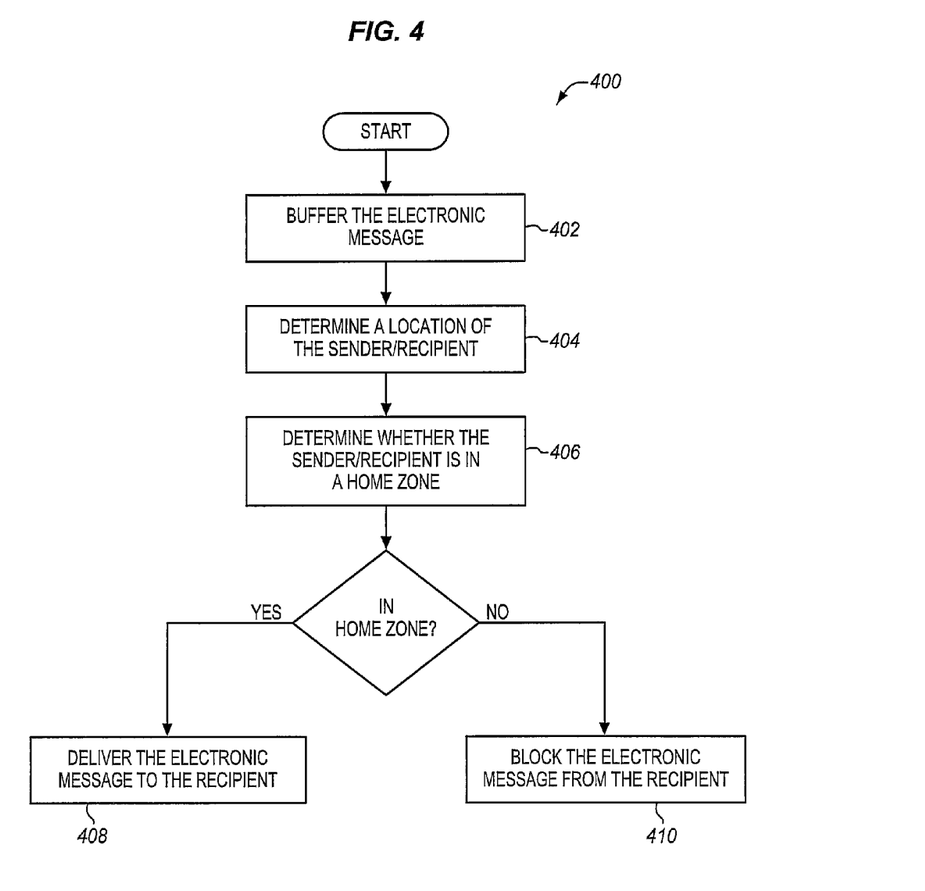
FIG. 4 is a flow chart illustrating a method of retrying electronic message delivery in an exemplary embodiment of the invention.

FIG. 4 is a flow chart illustrating a method 400 of retrying electronic message delivery in an exemplary embodiment of the invention. The steps of method 400 will be described with reference to communication network 100 in FIG. 1, but method 400 is not limited to the structure shown in FIG. 1. The steps of the flow chart in FIG. 4 are not all inclusive and may include other steps not shown.

In step 402, messaging system 102 buffers the electronic message if the electronic message is blocked. The service provider predefines a retry time interval, such as one minute, two minutes, three minutes, etc, after which a retry is initiated. In step 404, after the retry time interval has been reached, home zone system 104 determines the location of sender 111 or recipient 112 after the retry time interval. Home zone system 104 determines the location of sender 111 or recipient 112 depending on which of the them is being checked (or both) based on method 200 or method 300 described above. In step 406, home zone system 104 determines whether sender 111 or recipient 112 has moved into a home zone. If sender 111 or recipient 112 has moved into a home zone, then messaging system 102 delivers the electronic message to recipient 112 in step 408. If sender 111 or recipient 112 has not moved into a home zone, then messaging system 102 continues to block the electronic message in step 410. Method 400 may be repeated a number of times defined by the service provider, such as ten retries, before the electronic message is dropped.

Figure 5:
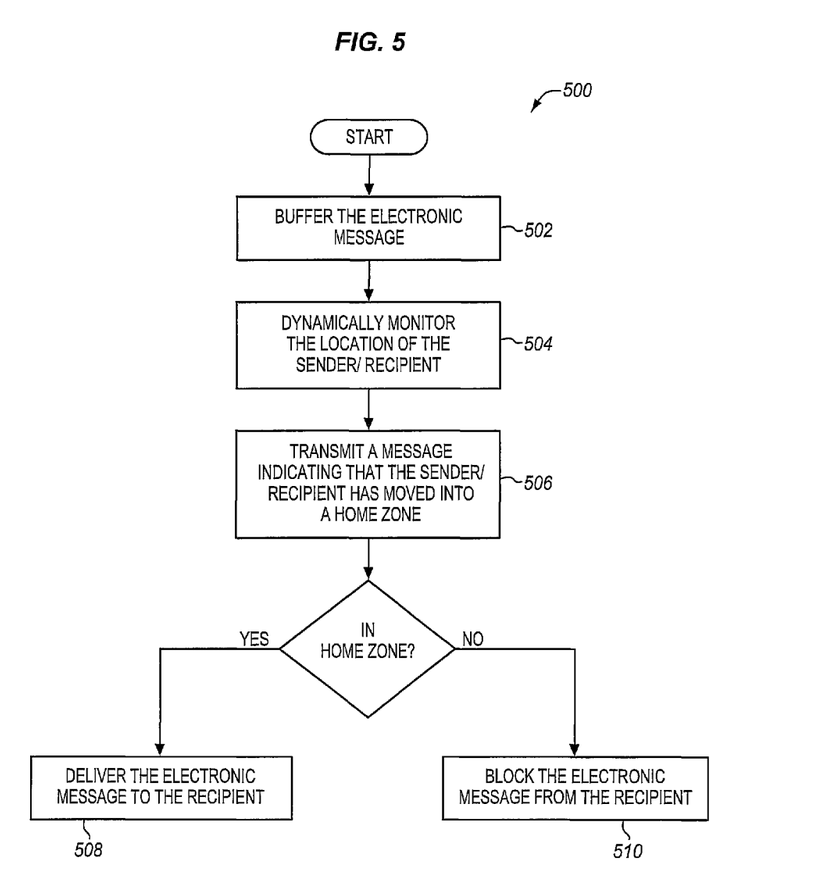
FIG. 5 is a flow chart illustrating another method of retrying electronic message delivery in an exemplary embodiment of the invention.

FIG. 5 is a flow chart illustrating another method 500 of retrying electronic message delivery in an exemplary embodiment of the invention. The steps of method 500 will be described with reference to communication network 100 in FIG. 1, but method 500 is not limited to the structure shown in FIG. 1. The steps of the flow chart in FIG. 5 are not all inclusive and may include other steps not shown.

In step 502, messaging system 102 buffers the electronic message if the electronic message is blocked. In step 504, home zone system 104 dynamically monitors the location of sender 111 or recipient 112 to determine whether sender 111 or recipient 112 has moved into a home zone. In step 506, home zone system 104 transmits a message to messaging system 102 if sender 111 or recipient 112 moves into a home zone. If sender 111 or recipient 112 has moved into a home zone, then messaging system 102 delivers the electronic message to recipient 112 in step 508. If sender 111 or recipient 112 has not moved into a home zone, then messaging system 102 continues to block the electronic message in step 510. Home zone system 104 may dynamically monitor the location of sender 111 or recipient 112 for a time period defined by the service provider before dropping the electronic message.

Figure 6:
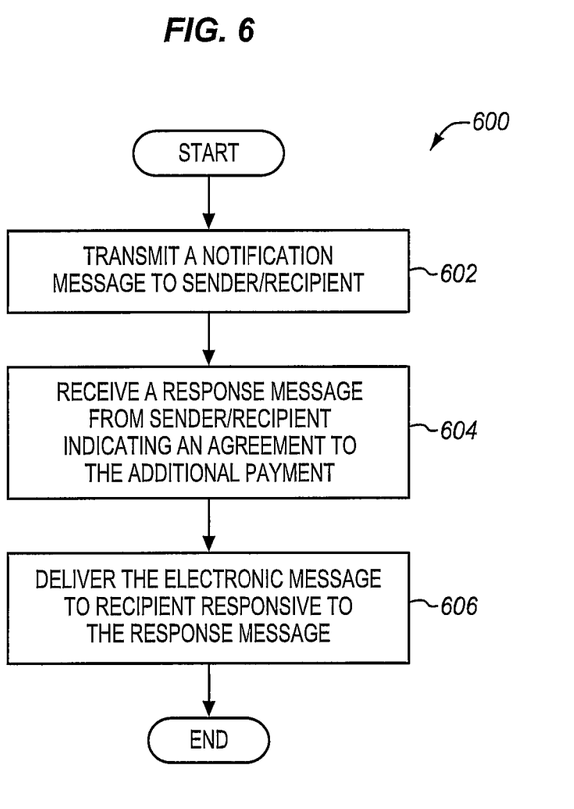
FIG. 6 is a flow chart illustrating a method of providing delivery of the electronic message for an additional payment in an exemplary embodiment of the invention.

In addition to retry or as an alternative, communication network 100 may deliver the electronic message to recipient 112 for an additional payment even if sender 111 or recipient 112 is not located in a home zone. FIG. 6 is a flow chart illustrating a method 600 of providing delivery of the electronic message for an additional payment in an exemplary embodiment of the invention. The steps of method 600 will be described with reference to communication network 100 in FIG. 1, but method 600 is not limited to the structure shown in FIG. 1. The steps of the flow chart in FIG. 6 are not all inclusive and may include other steps not shown.

In step 602, messaging system 102 transmits a notification message to sender 111 or recipient 112 (or both) indicating that additional payment is needed for delivery of the electronic message. The notification message may comprise a text message, a multimedia message, an interactive voice message, or another type of message. In step 604, messaging system 102 receives a response message from sender 111 or recipient 112 indicating an agreement to the additional payment. The response message may comprise a text message, a multimedia message, an interactive voice message, a feature code or key stroke, or another type of message. In step 606, messaging system 102 delivers the electronic message to recipient 112 responsive to the response message indicating an agreement to the additional payment.

Example

Figure 7:
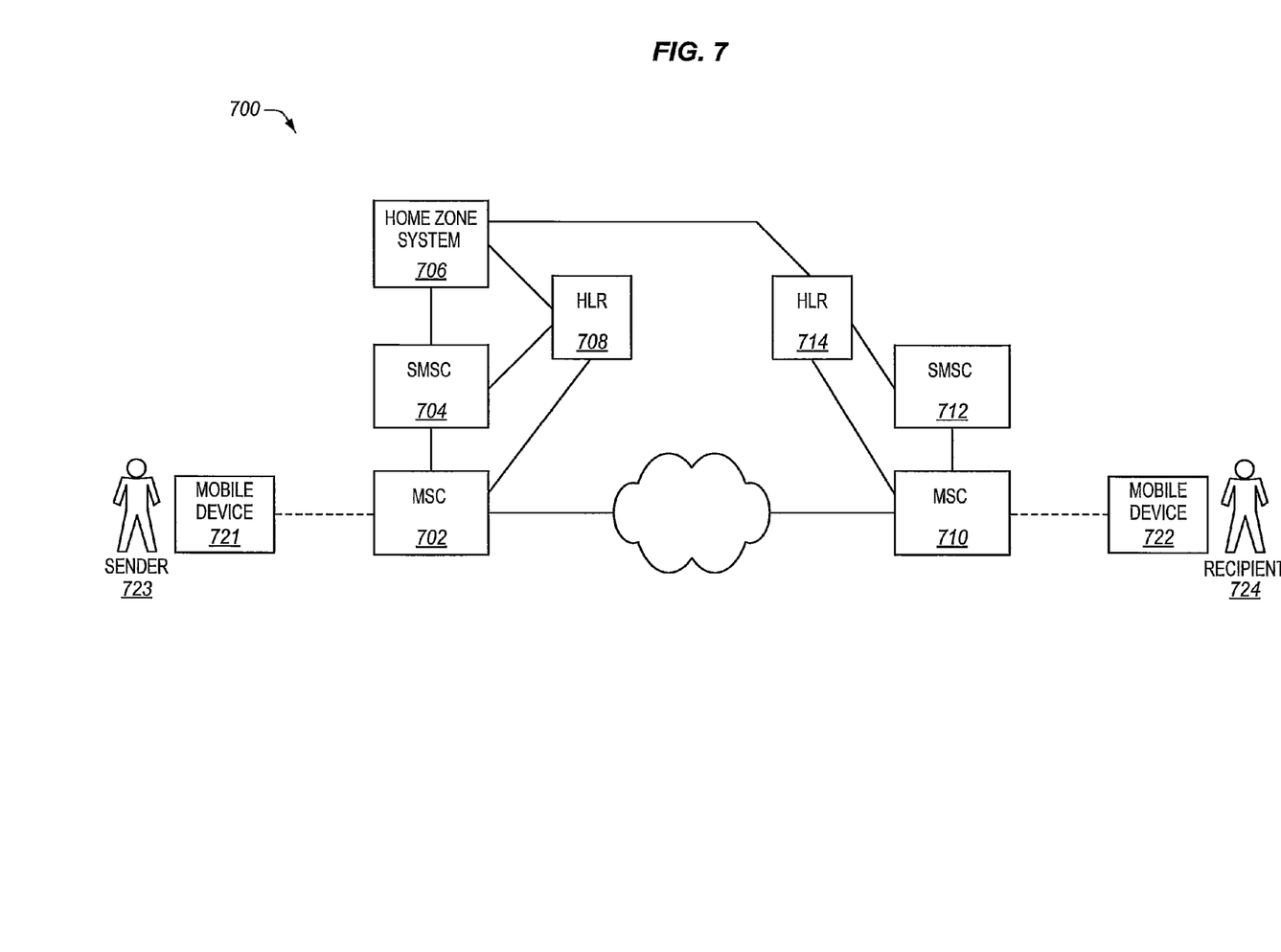
FIG. 7 illustrates a wireless network in an exemplary embodiment of the invention.

FIG. 7 illustrates a wireless network 700 in an exemplary embodiment of the invention. Wireless network 700 is adapted to provide a Short Message Service (SMS) between a first mobile device 721 and a second mobile device 722. Although this embodiment applies to a wireless network and SMS messaging, the functionality described below applies to other networks utilizing any electronic messaging service. Wireless network 700 is illustrated as including a Mobile Switching Center (MSC) 702 serving mobile device 721, a Short Message Service Center (SMSC) 704, a home zone system 706, and a Home Location Register (HLR) 708 storing a subscriber profile for a sender 723 operating mobile device 721. Wireless network 700 is further illustrated as including an MSC 710, a SMSC 712, and an HLR 714 storing a subscriber profile for a recipient 724 operating mobile device 722.

Figure 8:
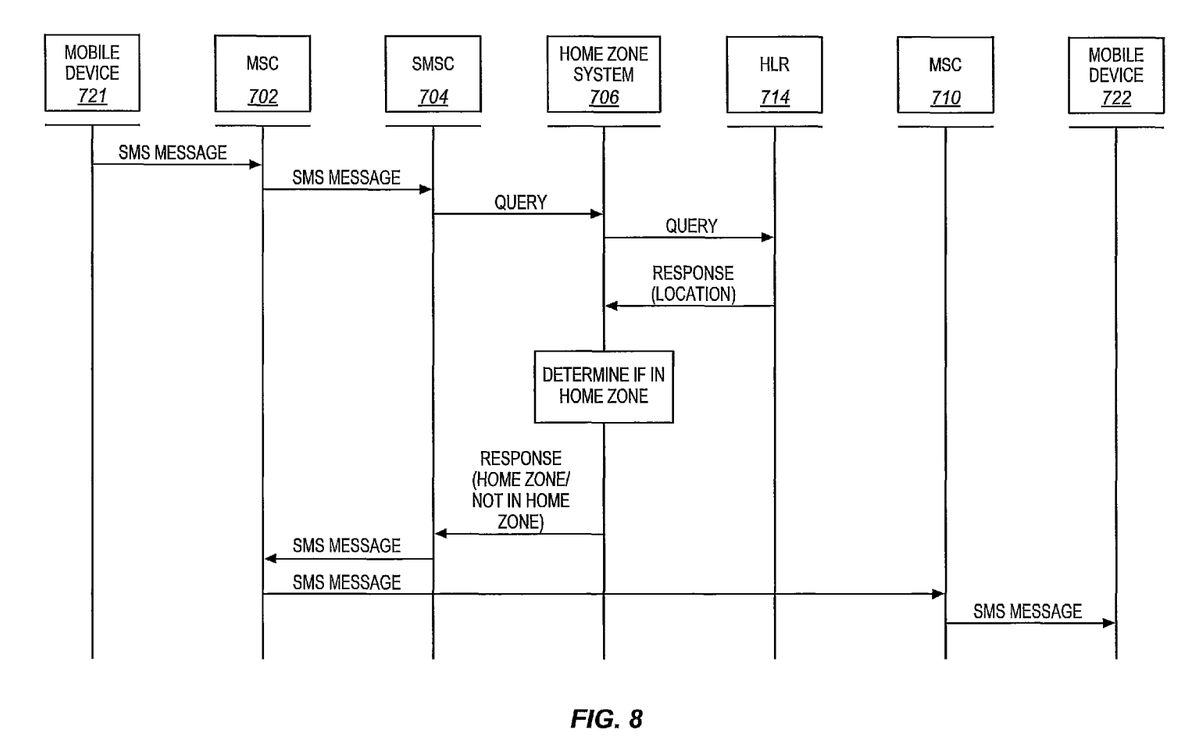
FIG. 8 is a message diagram illustrating messaging in the wireless network of FIG. 7 to provide an SMS messaging service in an exemplary embodiment of the invention.

FIG. 8 is a message diagram illustrating SMS messaging in wireless network 700 in an exemplary embodiment of the invention. Assume for this embodiment that sender 723 wants to transmit an SMS message to recipient 724. To send the SMS message, sender 723 originates an SMS message through mobile device 721, and mobile device 721 transmits the SMS message to MSC 702. MSC 702 identifies the received message to be an SMS message, and forwards the SMS message to SMSC 704. SMSC 704 determines that home zone delivery is only allowed for recipients in their home zone. Thus, SMSC 704 transmits a query to home zone system 706 to determine whether recipient 724 is located in a home zone for recipient 724. The query may be a Lightweight Directory Application Protocol (LDAP) message or a message of another appropriate protocol. The query may include the directory number for recipient 724 or other information.

Home zone system 706 transmits a query to HLR 714 to determine the present location of recipient 724 (and his/her associated mobile device 722). The query may be an Any Time Interrogation (ATI) message or a message of another appropriate protocol. HLR 714 stores a present location of recipient 724, such as an MSC ID and Cell ID, a latitude/longitude, an area code (for wireline), or other location information. HLR 714 then transmits a response to the query from home zone system 706 with the location information for recipient 724. The response may be an ATI message or a message of another appropriate protocol.

Home zone system 706 then compares the present location information for recipient 724 to a mapping data structure to determine if recipient 724 is located in his/her home zone. The mapping data structure is pre-provisioned by the service provider operating wireless network 700 to define the home zones within the network. The mapping data structure maps locations to home zones or calling areas. Recipient 724 may have one or more home zones.

If recipient 724 is located in a home zone, then home zone system 706 transmits a response to SMSC 704 indicating that recipient 724 is located in a home zone. The response may be an LDAP message or a message of another appropriate protocol. SMSC 704 then identifies the routing address for the SMS message from HLR 708 or HLR 714, and transmits the SMS message to MSC 702. MSC 702 then routes the SMS message to MSC 710, and MSC 710 delivers the SMS message to mobile device 722 for receipt by recipient 724.

In an alternative embodiment, home zone system 706 may not wait for a query from SMSC 704 before determining the location of recipient 724 through HLR 714. Home zone system 706 may dynamically update the location of recipient 724 and determine whether recipient 724 is located in a home zone. If SMSC 704 does transmit a query to home zone system 706, then home zone system 706 can immediately transmit a response to SMSC 704 indicating whether recipient 724 is located in a home zone.

If recipient 724 is not located in a home zone, then SMSC 704 blocks the SMS message and does not deliver the SMS message to recipient 724. Wireless network 700 may then operate in a variety of ways in FIG. 7.

In one embodiment, SMSC 704 and/or home zone system 706 may initiate a retry for delivery of the SMS message. For a retry, when SMSC 704 determines that recipient 724 is not located in a home zone, SMSC 704 buffers the SMS message, sets a timer, and monitors a retry time interval defined by the service provider. When the timer has reached the retry time interval, SMSC 704 repeats the process of querying the home zone system 706 to determine if recipient 724 has moved into a home zone. Responsive to the new query from SMSC 704, home zone system 706 transmits a query to HLR 714 to determine the present location of recipient 724 (and his/her associated mobile device 722). HLR 714 transmits a response to the query from home zone system 706 with the location information for recipient 724. Home zone system 706 again compares the present location information for recipient 724 to a mapping structure to determine if recipient 724 is located in his/her home zone. If recipient 724 has moved into a home zone, then home zone system 706 transmits a response to SMSC 704 affirming that recipient 724 is located in a home zone. SMSC 704 transmits the SMS message to MSC 702, and MSC 702 routes the SMS message to MSC 710. MSC 710 then delivers the SMS message to mobile device 722 for receipt by recipient 724. The service provider may provision a number of retries that are allowed before dropping the SMS message from delivery, such as one retry, two retries, three retries, etc.

In another embodiment of a retry, when SMSC 704 determines that recipient 724 is not located in a home zone, SMSC 704 buffers the SMS message and waits. Home zone system 706 dynamically transmits queries to HLR 714 to determine the present location of recipient 724 (and his/her associated mobile device 722). HLR 714 transmits a response to the query from home zone system 706 with the location information for recipient 724. Home zone system 706 compares the present location information for recipient 724 to a mapping data structure to determine if recipient 724 is located in his/her home zone. If recipient 724 has moved into a home zone, then home zone system 706 transmits a message to SMSC 704 indicating that recipient 724 has moved into a home zone. SMSC 704 then transmits the SMS message to MSC 702, and MSC 702 routes the SMS message to MSC 710. MSC 710 delivers the SMS message to mobile device 722 for receipt by recipient 724. The service provider may define how long SMSC 704 buffers the SMS message before dropping the SMS message, such as one hour, two hours, three hours, etc.

If retry is not allowed or if recipient 724 does not move to a home zone, then wireless network 700 may allow the delivery of the SMS message for an additional charge to sender 723. When SMSC 704 determines that recipient 724 is not located in a home zone, SMSC 704 transmits a notification message to sender 723 indicating that additional payment is needed for delivery of the SMS message. If SMSC 704 receives a response message from sender 723 indicating an agreement to the additional payment, then SMSC 704 transmits the SMS message and charging information to MSC 702. MSC 702 routes the SMS message to MSC 710, and MSC 710 delivers the SMS message to mobile device 722 for receipt by recipient 724. MSC 702 also generates a billing record for the additional payment agreed to by sender 723.

Wireless network 700 may alternatively allow the delivery of the SMS message for an additional charge to recipient 724. When SMSC 704 determines that recipient 724 is not located in a home zone, SMSC 704 transmits the SMS message to MSC 702. The SMS message header includes an indication that additional payment is needed for delivery of the SMS message. MSC 702 routes the SMS message to MSC 710, which routes the SMS message to SMSC 712. SMSC 712 processes the message header to identify that additional payment is needed for delivery of the SMS message. SMSC 712 then transmits a notification message to recipient 724 indicating that additional payment is needed for delivery of the SMS message. If SMSC 712 receives a response message from recipient 724 indicating an agreement to the additional payment, then SMSC 712 transmits the SMS message and charging information to MSC 710. MSC 710 delivers the SMS message to mobile device 722 for receipt by recipient 724. MSC 710 also generates a billing record for the additional payment agreed to by recipient 724.

The embodiment described in FIGS. 7-8 checks the location of recipient 724 before delivering the SMS message. Wireless network 700 may additionally or alternatively be configured to check the location of sender 723 before delivering the SMS message in a similar manner.

Although specific embodiments were described herein, the scope of the invention is not limited to those specific embodiments. The scope of the invention is defined by the following claims and any equivalents thereof.

We claim:

1. A system comprising:
a messaging system of a communication network that is adapted to receive a text message from a device of a sender, and to query a home zone system to determine whether a recipient of the text message is located in a home zone before attempting delivery of the text message to the recipient, wherein the home zone is a geographic area within the communication network where charging is treated differently than non-home zones;
the messaging system is further adapted to deliver the text message to the recipient if the recipient is located in the home zone, and to block the text message from being delivered to the recipient if the recipient is not located in the home zone and is located in an area of the communication network outside of the home zone;
if the text message is blocked in the messaging system, then the messaging system is further adapted to transmit a notification message to the recipient indicating that additional payment is needed for delivery of the text message, to receive a response message from the recipient indicating an agreement to the additional payment, and to deliver the text message to the recipient responsive to the response message.

2. The system of claim 1 wherein if the text message is blocked in the messaging system, then:
the messaging system is further adapted to buffer the text message;
the home zone system is adapted to determine the location of the recipient after a retry time interval, and to determine whether the recipient has moved into the home zone; and
the messaging system is further adapted to deliver the text message to the recipient if the recipient has moved into the home zone.

3. The system of claim 1 wherein if the text message is blocked in the messaging system, then:
the messaging system is further adapted to buffer the text message;
the home zone system is adapted to dynamically monitor the location of the recipient to determine whether the recipient has moved into the home zone; and
the messaging system is further adapted to deliver the text message to the recipient if the recipient has moved into the home zone.

4. The system of claim 1 wherein if the text message is blocked in the messaging system, then the messaging system is further adapted to:
transmit a notification message to the sender indicating that additional payment is needed for delivery of the text message;
receive a response message from the sender indicating an agreement to the additional payment; and
deliver the text message to the recipient responsive to the response message.

5. A method comprising:
defining a geographic area within a communication network which represents a home zone where charging is treated differently than non-home zones;
receiving a text message from a device of a sender into a messaging system implemented in the communication network;
determining a location of a recipient of the text message;
determining whether the recipient is located in a home zone defined for the recipient;
delivering the text message from the messaging system to the recipient responsive to determining that the recipient is located in the home zone; and
blocking the text message in the messaging system from being delivered to the recipient responsive to determining that the recipient is not located in the home zone and is located in an area of the communication network outside of the home zone;
if the text message is blocked, then the method further comprises:
transmitting a notification message to the recipient indicating that additional payment is needed for delivery of the text message;
receiving a response message from the recipient indicating an agreement to the additional payment; and
delivering the text message to the recipient responsive to the response message.

6. The method of claim 5 wherein if the text message is blocked, then the method further comprises:
buffering the text message;
determining the location of the recipient after a retry time interval;
determining whether the recipient has moved into the home zone; and
delivering the text message to the recipient responsive to determining that the recipient has moved into the home zone.

7. The method of claim 5 wherein if the text message is blocked, then the method further comprises:
buffering the text message;
dynamically monitoring the location of the recipient to determine whether the recipient has moved into the home zone; and
delivering the text message to the recipient responsive to determining that the recipient has moved into the home zone.

8. A system comprising:
a messaging system of a communication network that is adapted to receive a text message from a device of a sender, and to query a home zone system to determine whether the sender of the text message is located in a home zone before attempting delivery of the text message to a recipient, wherein the home zone is a geographic area within the communication network where charging is treated differently than non-home zones;
the messaging system is further adapted to deliver the text message to the recipient if the sender is located in the home zone, and to block the text message from being delivered to the recipient if the sender is not located in the home zone and is located in an area of the communication network outside of the home zone;
if the text message is blocked in the messaging system, then the messaging system is further adapted to:
transmit a notification message to the sender indicating that additional payment is needed for delivery of the text message;
receive a response message from the sender indicating an agreement to the additional payment; and
deliver the text message to the recipient responsive to the response message.

9. The system of claim 8 wherein if the text message is blocked in the messaging system, then:
- the messaging system is further adapted to buffer the text message;
- the home zone system is adapted to determine the location of the sender after a retry time interval, and to determine whether the sender has moved into the home zone; and
- the messaging system is further adapted to deliver the text message to the recipient if the sender has moved into the home zone.

10. The system of claim 8 wherein if the text message is blocked in the messaging system, then:
- the messaging system is further adapted to buffer the text message;
- the home zone system is adapted to dynamically monitor the location of the sender to determine whether the sender has moved into the home zone, and to transmit a message to the messaging system if the sender has moved into the home zone; and
- the messaging system is further adapted to deliver the text message to the recipient if the sender has moved into the home zone.

11. The system of claim 8 wherein if the text message is blocked in the messaging system, then the messaging system is further adapted to:
- transmit a notification message to the recipient indicating that additional payment is needed for delivery of the text message;
- receive a response message from the recipient indicating an agreement to the additional payment; and
- deliver the text message to the recipient responsive to the response message.

12. A method comprising:
- defining a geographic area within a communication network which represents a home zone where charging is treated differently than non-home zones;
- receiving a text message from a device of a sender into a messaging system implemented in the communication network;
- determining a location of the sender;
- determining whether the sender is located in a home zone defined for the sender;
- delivering the text message from the messaging system to a recipient responsive to determining that the sender is located in the home zone; and
- blocking the text message in the messaging system from being delivered to the recipient responsive to determining that the sender is not located in the home zone and is located in an area of the communication network outside of the home zone;
- if the text message is blocked, then the method further comprises:
  - transmitting a notification message to the sender indicating that additional payment is needed for delivery of the text message;
  - receiving a response message from the sender indicating an agreement to the additional payment; and
  - delivering the text message to the recipient responsive to the response message.

13. The method of claim 12 wherein if the text message is blocked, then the method further comprises:
- buffering the text message;
- determining the location of the sender after a retry time interval;
- determining whether the sender has moved into the home zone; and
- delivering the text message to the recipient responsive to determining that the sender has moved into the home zone.

14. The method of claim 12 wherein if the text message is blocked, then the method further comprises:
- buffering the text message;
- dynamically monitoring the location of the sender to determine whether the sender has moved into the home zone; and
- delivering the text message to the recipient responsive to determining that the sender has moved into the home zone.

15. A communication network comprising:
- a home zone system, implemented in the communication network, that is adapted to define a geographic area within the communication network which represents a home zone where charging is treated differently than non-home zones, and to monitor whether a subscriber that subscribes to a text messaging service is located in a home zone defined for the subscriber; and
- a messaging system, implemented in the communication network, that is adapted to receive a text message sent to or received from the subscriber, to transmit a query to the home zone system to determine whether the subscriber is located in the home zone, to deliver the text message responsive to the home zone system determining that the subscriber is located in the home zone, and to block the text message from being delivered to the recipient responsive to the home zone system determining that the subscriber is not located in the home zone and is located in an area of the communication network outside of the home zone;
- if the text message is blocked in the messaging system, then the messaging system is further adapted to transmit a notification message to the subscriber indicating that additional payment is needed for delivery of the text message, to receive a response message from the subscriber indicating an agreement to the additional payment, and to deliver the text message responsive to the response message.

16. The communication network of claim 15 wherein if the text message is blocked in the messaging system, then:
- the messaging system is further adapted to buffer the text message, to transmit another query to the home zone system after a retry time interval to determine whether the subscriber has moved into the home zone, and to deliver the text message responsive to the home zone system determining that the subscriber has moved into the home zone.

17. The communication network of claim 15 wherein if the text message is blocked in the messaging system, then:
- the messaging system is further adapted to buffer the text message;
- the home zone system is further adapted to identify whether the subscriber has moved into the home zone, and to transmit a message to the messaging system responsive to identifying that the subscriber has moved into the home zone; and
- the messaging system is further adapted to deliver the text message responsive to the home zone system determining that the subscriber has moved into the home zone.

* * * * *